(12) United States Patent
Charier et al.

(10) Patent No.: US 11,560,809 B2
(45) Date of Patent: Jan. 24, 2023

(54) ELECTRIC MODULE FOR AN AIRCRAFT FAN COMPRISING BLADES WITH IMPROVED ATTACHMENT

(71) Applicant: SAFRAN AIRCRAFT ENGINES, Paris (FR)

(72) Inventors: Gilles Alain Marie Charier, Moissy-Cramayel (FR); Caroline Marie Frantz, Moissy-Cramayel (FR); Loïc Paul Yves Guillotel, Moissy-Cramayel (FR); Vincent François Georges Millier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/287,388

(22) PCT Filed: Oct. 16, 2019

(86) PCT No.: PCT/FR2019/052444
§ 371 (c)(1),
(2) Date: Jun. 17, 2021

(87) PCT Pub. No.: WO2020/084221
PCT Pub. Date: Apr. 30, 2020

(65) Prior Publication Data
US 2021/0396147 A1    Dec. 23, 2021

(30) Foreign Application Priority Data

Oct. 26, 2018 (FR) ...................................... 1859936

(51) Int. Cl.
*F02K 3/06* (2006.01)
*F01D 15/10* (2006.01)

(52) U.S. Cl.
CPC ................ *F01D 15/10* (2013.01); *F02K 3/06* (2013.01); *F05D 2220/36* (2013.01); *F05D 2220/76* (2013.01)

(58) Field of Classification Search
CPC .............................. F02K 3/06; F05D 2220/36
See application file for complete search history.

(56) References Cited

U.S. PATENT DOCUMENTS 3,918,840 A * 11/1975 Haworth ............... F04D 29/322
                                                       416/190
7,603,864 B2 * 10/2009 Gemin .................... F01D 15/10
                                                       290/1 A
(Continued)

FOREIGN PATENT DOCUMENTS

CN        106516127 A      3/2017
DE     102015214255 A1    2/2017
(Continued)

OTHER PUBLICATIONS

International Search Report dated Mar. 20, 2020, issued in corresponding International Application No. PCT/FR2019/052444, filed on Oct. 16, 2019, and its English translation thereof, 2 pages.
(Continued)

*Primary Examiner* — Lorne E Meade
(74) *Attorney, Agent, or Firm* — Christensen O'Connor Johnson Kindness PLLC

(57) ABSTRACT

An electric module of a fan includes a fan provided with blades which are rotatably movable inside a casing, and an electric machine having a rotor secured to the fan and a stator integrated into said casing. The rotor of the electric machine is integrated into the fan and includes a removable ring which captures axially and transversely from the radially outer ends the blades of the fan and which is received inside said stator which is integrated into the casing.

11 Claims, 7 Drawing Sheets

(56) References Cited

U.S. PATENT DOCUMENTS

| | | | |
|---|---|---|---|
| 7,798,778 B2* | 9/2010 | Martensson | F04D 29/321 |
| | | | 416/190 |
| 7,952,244 B2* | 5/2011 | Colin | F01D 15/10 |
| | | | 310/67 R |
| 9,143,023 B1* | 9/2015 | Uskert | H02K 29/00 |
| 9,963,981 B2* | 5/2018 | Joshi | F01D 15/10 |
| 10,807,730 B2* | 10/2020 | Joshi | B64D 27/24 |
| 2007/0029803 A1* | 2/2007 | Randall | F01D 15/10 |
| | | | 310/90.5 |
| 2016/0363050 A1 | 12/2016 | Joshi et al. | |

FOREIGN PATENT DOCUMENTS

| | | |
|---|---|---|
| EP | 2048329 A1 | 4/2009 |
| GB | 2360752 A | 10/2001 |
| WO | 2007036202 A1 | 5/2007 |

OTHER PUBLICATIONS

Written Opinion of the International Searching Authority dated Mar. 20, 2020, issued in corresponding International Application No. PCT/FR2019/052444, filed on Oct. 16, 2019, 5 pages.

\* cited by examiner

ELECTRIC MODULE FOR AN AIRCRAFT FAN COMPRISING BLADES WITH IMPROVED ATTACHMENT

CROSS-REFERENCES TO RELATED APPLICATIONS

This application is a National Stage of International Application No. PCT/FR2019/052444 filed Oct. 16, 2019, which claims priority to French Patent Application No. 1859936, filed Oct. 26, 2018, the disclosures of which are incorporated by reference in entirety.

The invention concerns an aircraft engine electric fan module comprising an electric machine.

The invention relates more particularly to an aircraft electric fan module comprising a fan provided with vanes, which are rotatably movable inside a casing, and an electric machine comprising a rotor secured to the fan and a stator integrated into said casing.

Depending on its configuration, an electric fan module can perform several functions.

A electric fan module can generate electricity and provide thrust and be supplied with mechanical energy by a turbine. In this case, it is part of a turbojet engine.

An electric fan module may consume electricity to produce a thrust. It may also be supplied by a turbine. It may be independent of a turbojet engine and supplied solely by electricity, or alternatively, it may be part of a turbojet engine with an external power supply.

An electric fan module can also generate electricity by operating as a wind turbine. The thruster may be independent of a turbojet engine or may be part of a turbojet engine. In the latter case, the turbine of the turbojet engine is not functional during this mode of operation.

The invention relates to an electric fan module defined according to the above terms. In this case, the electric fan module is an element of a turbojet engine driven by a turbine of this turbojet engine, preferably a low-pressure turbine of a low-pressure body thereof.

BACKGROUND

A conventional engine for powering a commercial aircraft is typically a double body or triple body turbojet engine which comprises a high-pressure body comprising a high-pressure compressor and a high-pressure turbine, a low-pressure body comprising a low-pressure compressor and a low-pressure turbine and driving the fan, and optionally an intermediate pressure body comprising an intermediate pressure compressor and an intermediate pressure turbine, housed in a nacelle of the turbojet engine.

The power supplied by such a turbojet engine is generally intended to ensure the propulsion of the aircraft but also to ensure the production of electrical current intended to ensure various on-board functions of the aircraft such as, in a non-exhaustive manner, the supply of power to the flight controls, the anti-icing of the wings, the supply of power to the cabin air-conditioning system, the lighting of the cabin, or the supply of power to the cockpit of the aircraft.

Conventionally, a turbojet engine comprises a gearbox or AGB (Accessory Gear Box) which is arranged outside the turbojet engine, which is mechanically connected by a radial secondary shaft to the high-pressure body, and which comprises a generator used to transform a part of the mechanical power delivered by the turbojet engine into electrical power, and a starter for starting the turbomachine.

The current trend is to increase the proportion of on-board electrical equipment, which is considered to be more flexible in use in the aircraft than purely mechanical equipment, for example to drive compressors intended to pressurise the aircraft cabin, in addition to the equipment mentioned above. The electrical power requirements that can be supplied by the turbojet engine are therefore increasing and can no longer be provided by conventional electric generators without leading to an overall increase in the weight of the turbojet engine and a deterioration in overall performance.

There is therefore a real interest in electric machines that can perform additional generator functions allowing to provide additional electrical power. The reversible electric machines perform this generator function, but they also perform starter functions, and in this regard such machines provide an obvious weight saving.

According to an embodiment known from the international application WO-2007/036.202, an electric machine, operating in a reversible manner and therefore combining the functions of generator and starter, can be arranged inside the turbojet engine itself, more precisely in the high-pressure body.

In this document, when the turbojet engine is started, the high-pressure body is first set in rotation, using the electric generator as an electric motor. The high-pressure compressor then supplies the combustion chamber with pressurised air, allowing combustion to take place and at the high-pressure stage of the turbojet engine to start. The low-pressure turbine is then rotated by the outgoing primary airflow, driving the low-pressure body and the fan. The turbojet engine is then started, and the power of the electric starter is cut, which stops working as a drive motor for the high-pressure compressor.

The main advantage of the arrangement of the electric generator in the high-pressure body is that this generator can be used as electric motor for starting the turbojet engine, and it can also be used as electric generator to supply power to the rest of the aircraft.

This electric machine does not constitute an additional generator, as it replaces the previously known generator and starter in the prior art, but it does not provide any significant gain in electrical power to the aircraft.

In addition, this arrangement has the disadvantage of presenting a poor overall efficiency of the conversion of mechanical power into electrical power. Indeed, the extra fuel consumption required to provide a given electrical power is greater when the electric generator draws power from the high-pressure body than when it draws power from the low-pressure body.

The arrangement of an electric generator in the high-pressure body also poses many space and accessibility problems.

In addition, the installation of an electric generator drawing its power from the high-pressure body can pose an operability problem for the turbojet engine, as too much mechanical power draw is likely to cause the HP compressor to surge, particularly when the engine is running at low speed.

Finally, this design does not allow the fan to be assisted by the electric machine, nor does it allow the fan to be driven purely electrically by the electric machine in the context of an aircraft engine without a turbomachine and all-electric.

To overcome these disadvantages, a turbojet engine comprising an electric fan module was proposed in EP-2.048.329. This turbojet engine comprises a high-pressure body and a low-pressure body driving a fan arranged in a fixed casing, and an electric generator arranged in the fan and drawing power from it, the generator comprising a rotor integrated into the fan, and a stator integrated into the fan casing. In this document, the rotor comprises permanent magnets which are integrated into the end of the fan vanes.

This solution allows a large space for the electric machine. The fan casing, which is connected to the nacelle, is large enough to house the windings for the generation of electrical current and electrical harnesses for the delivery of this current to a pylon supporting the turbojet engine. The installation and the maintenance of the electric generator are therefore not or only slightly disturbed by space problems.

In addition, the area of the fan, area delimited by the fan casing and the cowls surrounding the nacelle, is a cold area, relative to the other parts of the turbomachine, with a temperature typically below 70° C. This positioning allows to minimise the cooling stresses.

The permanent magnets of the electric machine do not require additional complex cooling means as the temperature within the fan never reaches the Curie temperature, above which they would lose their magnetic properties.

Similarly, as the windings of the electric machine are placed in the same cold area of the turbojet engine, they do not require additional complex cooling means such as liquid cooling systems but can simply be cooled by air.

The cooling means can therefore have a small size and mass.

Furthermore, due to the large size of the fan, it is possible to have a machine operating as a relatively high-powered electric generator, capable of simultaneously supplying power to various electrical equipment on the aircraft on which the turbojet engine is mounted.

This possibility is all the more important as the number of electrical equipment onboard on the aircraft is increasing.

A turbomachine equipped in this way also enables to avoid pumping phenomena and therefore problems of instability and operability of the turbojet engine at low speed, by avoiding drawing excessive power from the high-pressure body.

In this design and until now, the permanent magnets have been directly integrated into the vanes or attached in the form of stubs fixed to the tips of the vanes.

In both of these known designs, a mass is added to the end of each vane, and as a result the vanes are subjected to a greater centrifugal force than conventional vanes. This centrifugal force can lead to radial elongation of the vanes and be incompatible with maintaining adequate functional clearance between the vanes of the fan and its casing at all rotational speeds.

In addition, the overall increase in the mass of each vane, compared to a conventional vane, implies as we have seen an increase in the centrifugal forces acting on the vanes. As a result, these vanes require a larger hub or fan disc to hold them in the fan.

Finally, if such a vane is lost, the kinetic energy released by this vane is greater than that released by a conventional vane in the same case. It follows that the use of such a vane requires a more massive fan casing, capable of withstanding the ejection of such a vane without the risk of being passed through by it. Such a dimensional constraint greatly reduces the weight of the engine.

This design does not allow either for a purely electric drive of the fan by the electric machine alone in the context of an all-electric aircraft engine.

Furthermore, it is not possible to envisage a rigid assembly of the vanes at each of their ends as described in the documents CN-106.516.127-A, US-2016/363.050-A1 and GB-2.360.752-A.

SUMMARY OF THE INVENTION

The invention remedies these disadvantages by providing an engine comprising an annular-shaped electric machine arranged around the fan, the rotor of which is annular-shaped.

More particularly, the invention proposes an electric module of an aircraft fan of axis A comprising a fan provided with vanes, which are rotatably movable inside a casing, and an electric machine which can operate as a motor or as a generator comprising a rotor secured to the fan and a stator integrated into said casing, characterised in that the rotor of the electric machine is integrated into the fan and in that it comprises a removable annulus which captures only axially and transversely the radially outer ends of the vanes of the fan, which leaves each radially outer end radially free with respect to the annulus, and which is received inside said stator which is integrated into the casing.

Such an electric fan module is particularly suitable for use in a turbomachine architecture of the UHBR ID type (Ultra High By Pass Ratio, Integral Drive), which corresponds to an engine configuration comprising a turbomachine with a very high bypass ratio shrouded fan, said engine comprising a reduction gearbox connected to the LP body, the purpose of which is to be able to independently optimise the rotational speeds of the fan and the LP turbine and which comprises one or more electric machines on the HP and LP parts of the turbomachine having powers of a few kW to several MW.

According to other characteristics of the invention:

the annulus comprises an annular wall which extends at the level of the radially outer ends of the vanes and which comprises slots passed through by these radially outer ends, each slot having a shape complementary to that of the profile of the end of a vane, each radially outer end of a vane constitutes an extension which follows a chord at the tip of a blade of said vane, the annular wall of the annulus is constituted by an assembly of two annular rings, respectively upstream and downstream, said rings being provided with teeth which extend substantially axially and which are substantially complementary to each other so as to define between them said slots, the annulus comprises an annular flange carrying magnetic elements of the electric machine, which caps the two rings, and which comprises a first end received in an annular groove formed in an outer radial collar of a first of the rings and a second end provided with an inner radial collar immobilised against a free face of a second of the rings, the inner radial collar of the flange is immobilised by means of an outer annular lock which is pressed against said inner collar, and which receives axial screws which pass through said outer annular lock, the radial collar of the flange, the second ring and which are received in the first ring to clamp the rings against each other, each upstream or downstream ring is formed from an assembly of two upstream or downstream half-rings extending angularly over substantially 180 degrees, the casing comprises in its thickness an annular housing which receives the annular-shaped stator and the annulus, and which receives, on the side of the annular lock, a sectorised annular acoustic panel, the fan comprises a hub which carries the vanes, and roots of the vanes which are shaped like pins are threaded axially into complementary pinning zones which are formed on the periphery of an internal shroud of the hub and which open into an upstream face of said shroud, said roots being locked axially in the pinning zones by an inner annular lock which is secured by screws received in an upstream end of the shroud.

the hub comprises a sectorised annular covering wall which surrounds the shroud of the hub between the vanes and which is held axially between a rear collar of the shroud of the hub and the inner annular lock, and a fan cone which is secured to said inner annular lock.

The invention also relates to a turbomachine comprising an electric fan module of the type described above, said turbomachine comprising a planetary or epicyclic reduction gearbox, the members of which are connected to a casing of the turbomachine, to a shaft of the low-pressure body, and to a drive shaft of the hub of the fan.

The invention also relates to a method of disassembling and assembling/reassembling at least one vane of the electric fan module of the type described above, characterised in that it comprises:

a disassembly step comprising at least:
a first sub-step during which the fan cone, the inner annular lock, and at least one part of the sectorised annular covering wall of the fan hub are disassembled to free a root of said at least one vane,
a second sub-step during which at least one part of the sectorised acoustic panel facing at least one upstream half-ring facing said at least one vane is disassembled,
a third sub-step during which the outer annular lock is disassembled,
a fourth sub-step during which the annular flange is axially extracted,
a fifth sub-step during which at least one upstream half-ring facing said at least one vane is axially extracted,
a sixth sub-step during which the root of said at least one vane is axially extracted from the hub,
an assembly/reassembly step comprising the sub-steps of the disassembly step, taken in reverse order.

DESCRIPTION OF FIGURES

The invention will be better understood and other details, characteristics and advantages of the present invention will become clearer on reading the following description made by way of non-limiting example and with reference to the attached drawings, in which.

DETAILED DESCRIPTION

In the following description, identical reference numbers designate identical parts or parts having similar functions. The designations "upstream" and "downstream" are defined with respect to a direction of gas flow within a turbomachine.

The orientations are defined with respect to a trihedron L, T, R whose directions are a direction L, longitudinal and parallel to an axial direction A of the turbomachine, a radial direction R, perpendicular and intersecting the axial direction A of the turbomachine, and a direction T, transverse and perpendicular to the direction R.

Figure 1:
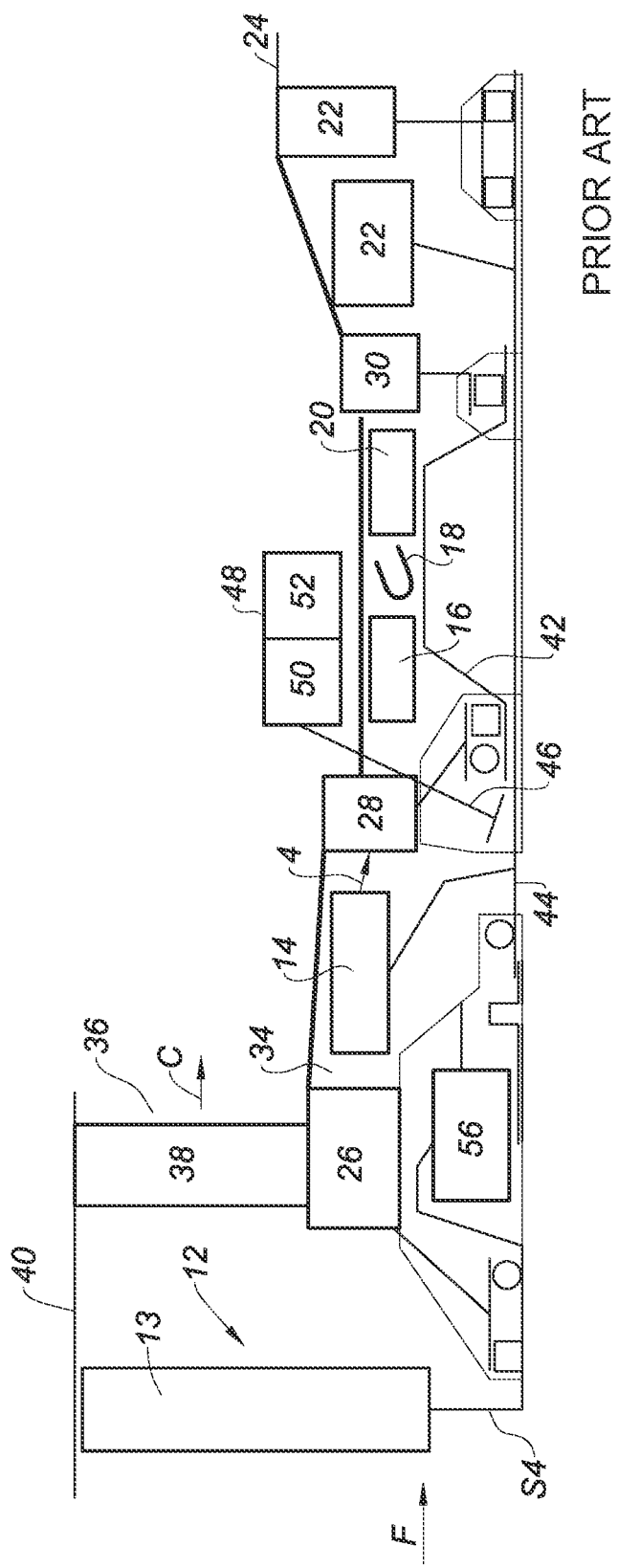
FIG. 1 is a general axial sectional view of a double flow turbojet engine of the UHBR ID type according to the prior art.

FIG. 1 shows a conventional aircraft turbomachine 10 of the UHBR ID type, which is here a double flow and double body turbojet engine. The overall architecture of this turbomachine 10 is a conventional two-body architecture, known from many turbomachines known in the prior art. For this reason, in the remainder of this description, any reference to the general architecture of a turbomachine according to the prior art will be made by considering FIG. 1.

Essentially, the turbomachine 10 comprises, from upstream to downstream in the direction of flow of the gas flows F in the turbomachine, a fan 12 provided with blades 13 and mounted so as to rotate in a casing 40, a low-pressure compressor 14, a high-pressure compressor 16, an annular combustion chamber 18, a high-pressure turbine 20, a low-pressure turbine 22 and an exhaust nozzle 24.

The low-pressure compressor 14, high-pressure compressor 16, annular combustion chamber 18, high-pressure turbine 20, low-pressure turbine 22 and exhaust nozzle 24 are respectively housed between upstream casing 26, inter-compressor casing 28, inter-turbine casing 30 and exhaust casing 32 of the turbomachine.

The airflow F penetrating into the fan is divided into a hot flow H which flows in a primary duct 34 through the low-pressure compressor 14, high-pressure compressor 16, annular combustion chamber 18, high-pressure turbine 20, low-pressure turbine 22 and exhaust nozzle 24, and a cold flow C flowing around the casings 26, 28, 30, 32 in a cold flow channel 36.

Vanes 38 of a straightener or OGV are placed in the cold flow channel 36 and help support the fan casing 40. The cold flow C and hot flow H meet at the outlet of the exhaust nozzle 24.

A rotor of the high-pressure compressor 16 and a rotor of the high-pressure turbine 20 are connected by a high-pressure shaft 42 and form a high-pressure body with it. A rotor of the low-pressure compressor 14 and a rotor of the low-pressure turbine 22 are connected by a low-pressure shaft 44 and together form a low-pressure body.

The high-pressure shaft 42 drives via a radial shaft 46 a gearbox 48 which contains a starter 50 and a generator 52.

According to some other architectures known to the prior art, the starter 50 and the generator 52 can be replaced by an electric machine (not shown) alternatively forming starter or generator.

In the upstream part of the turbomachine 10, the fan 12 is connected to a fan shaft 54 which, in the example shown, is rotatably connected to the LP shaft 44 via a reduction gearbox 56, for example a planetary or epicyclic reduction gearbox 56, which has been schematically shown here, whose one member is connected to the fan shaft 54, one member is connected to the low-pressure shaft 44 and one member is connected to the upstream casing 26.

The fan 12 can thus, when it is very large, be driven at a lower speed than the LP shaft 44, in order to better match it aerodynamically.

In this design, however, electrical power is only generated by the generator 52. As long as the electrical power requirements are limited, this design is suitable. However, the electrical power that can be effectively drawn by the generator 52 is limited and is not suitable for the increasing electrical power requirements of modern aircraft, as the production of more electrical power would necessarily result in additional mechanical power being drawn by the generator 52 from the high-pressure HP shaft 42, leading to a degradation of the performance of the HP compressor by risking pumping phenomena, especially at low HP shaft speeds.

In addition, in this configuration, the starter 48 only allows the turbomachine to be started, but is not able to transmit any driving power to the shaft 54 of the fan 12, since it is not linked to the LP shaft 44.

In order to benefit from greater electrical power, one solution is to provide a turbomachine 10 with an electric fan module comprising an electric machine linked to the fan 12. This electric machine is reversible and operates as a generator as well as a motor. As a generator, it is therefore able to supply electrical power independently or in addition to the generator 52.

Furthermore, as a motor, such an electric machine is also capable of performing propulsive functions and can provide an additional engine power to the fan.

Such electric machines have so far been proposed in two designs.

In a first design, it has been proposed to integrate the rotor of the electric machine directly into the fan by integrating the permanent magnets directly into the vanes 13. In a second design, shown in FIG. 2, the permanent magnets have been fitted as sectorial stubs which are attached to the end of the vanes 13.

In both cases, a mass has been added to the end of each vane 13, and as a result the adapted vanes 13 are subject to a greater centrifugal force than conventional vanes. This centrifugal force can lead to radial elongation phenomena of the vanes 13 and be incompatible with maintaining an adequate functional clearance between the vanes 13 of the fan 12 and its casing 40 at all rotational speeds.

In addition, a high mass vane 13 requires the use of a hub comprising a large central disc for its holding.

Finally, if such a vane 13 is lost, the kinetic energy released by this vane 13 is greater than that released by a conventional vane in the same case. It follows that the use of such a vane 13 requires a more massive fan casing 40, capable of withstanding the ejection of such a vane 13 without the risk of being passed through by it. Such a dimensional constraint largely penalises the mass of the engine.

The invention remedies this disadvantage by proposing an electric fan module 11 implementing a new rotor design for the electric machine integrated into the fan 12.

This module is, for example, integrated into a turbomachine which, like the turbomachine of the prior art, comprises a planetary or epicyclic reduction gearbox whose members are linked to a casing of the turbomachine, to a shaft of the low-pressure body, and to a drive shaft of a disc of the hub of the fan.

For example, a sun gear is linked to the shaft 44 of the low-pressure body, a planet carrier is linked to the drive shaft 54, and a ring gear is linked to the casing 26.

Figure 3:
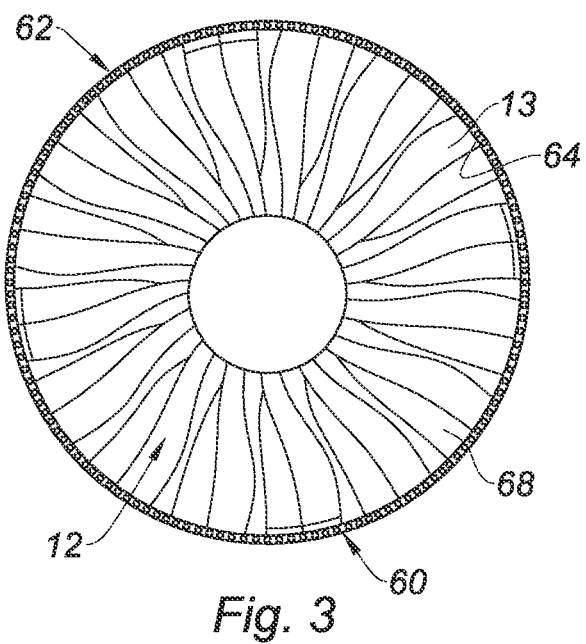
FIG. 3 is an end view of a fan comprising an electric machine rotor according to the invention.
Figure 4:
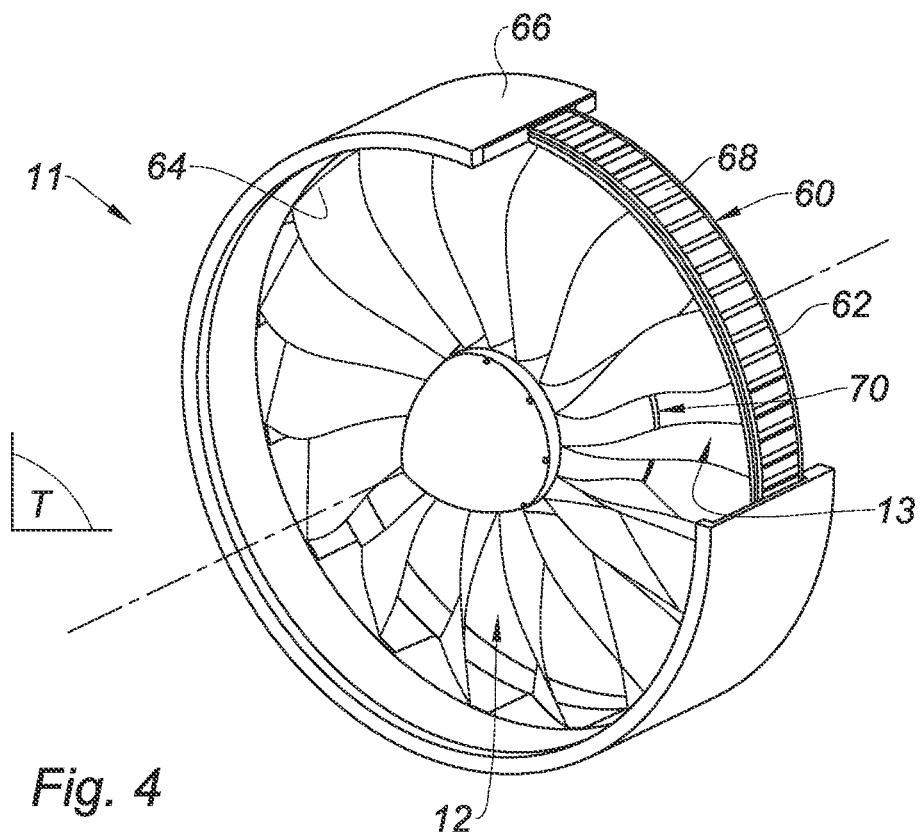
FIG. 4 is a partial cutaway perspective view of an electric machine according to the invention integrated into a fan.
Figure 5:
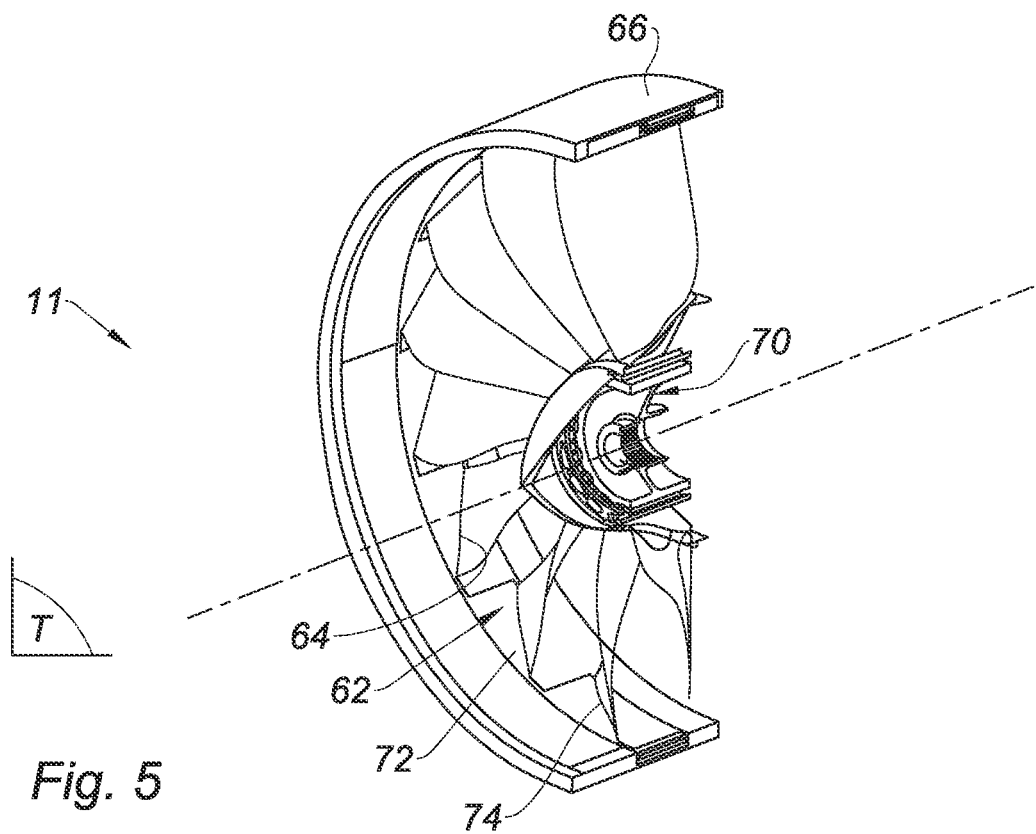
FIG. 5 is a cutaway perspective view of the electric machine of FIG. 4.

In accordance with the invention, as illustrated in FIG. 3 and more particularly in FIG. 4, the electric fan module comprises a rotor 60 of the electric machine which is integrated into the fan and comprises a removable annulus 62 which captures, solely axially along the axis A and transversely with respect to the axis A, radially outer ends 64 of the vanes 13 of the fan 12, and which leaves each radially outer end 64 radially free from the annulus 62. In this way, the ends 64 of the vanes 13 are susceptible to be subjected to a small amount of radial deflection as they are elongated by centrifugal forces.

Figure 6:
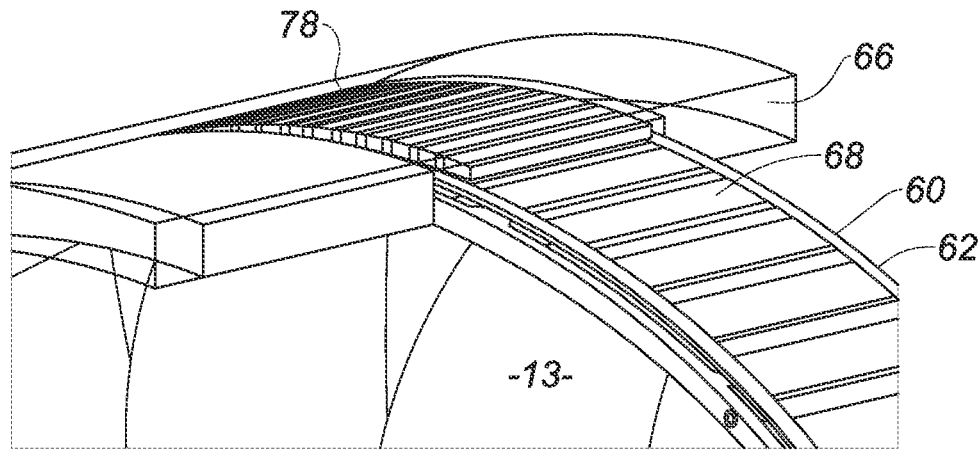
FIG. 6 is a detail view of FIG. 4.

This annulus 62 is, as shown in FIG. 3, received within a stator 66 which is intended to be integrated into the fan casing 40 previously shown in FIG. 1. According to the design which has been shown in the figures, the annulus 62 carries permanent magnets 74. As illustrated in the figure and in more detail in FIG. 6, the stator 66 carries windings 78 arranged in line with the permanent magnets 68 of the rotor 60. It will be understood that this configuration is not limiting the invention, and that the annulus 62 could for example comprise windings, the permanent magnets then being carried by the stator 66.

The configuration presented here allows the routing of the electrical auxiliaries of the electric machine, such as electrical harnesses connected to the windings 78, in a very simple manner, by connecting them directly to a pylon supporting the turbomachine, without requiring internal wiring to the turbomachine.

Various electric machine topologies are possible, such as axial, radial flow discoidal or asynchronous electric machines.

This configuration also allows a high degree of accessibility to the electric machine via fan cowls or access hatches (not shown) arranged in the casing 40 of the fan.

It also has the advantage of not increasing the size of the turbomachine, as the integration of the electric machine into the fan 12 has no impact on the length of the turbomachine.

Figure 2:
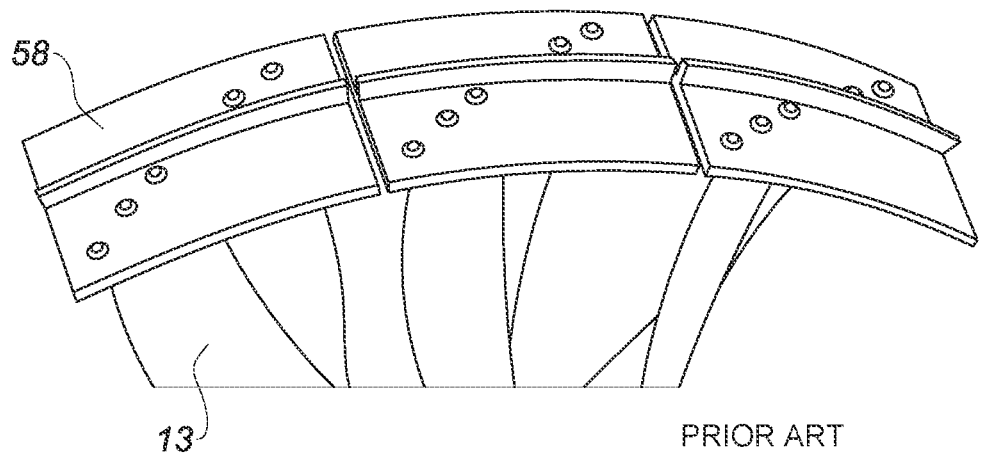
FIG. 2 is a perspective view of the ends of the vanes of a conventional fan integrating an electric machine rotor.

As illustrated in FIGS. 2 and 3, the configuration of the electric machine rotor 60 in the form of an annulus 62 encircling the ends 64 of the vanes 13 enables, as will be seen, to oppose the bending deformations that these would be likely to undergo in the context of a conventional design having the magnets placed at the end of the vanes 13. Above all, it allows the tensile stresses to which the vanes 13 are conventionally subjected under the effect of centrifugal forces, as will be seen, to be replaced by compressive stresses.

The annulus 62 also enables to distribute the mass of the permanent magnets 68 over its entire periphery.

The vanes 13 are preferably vanes of conventional construction, made of composite material, and therefore do not need to be made under a particular manufacturing method to be integrated into the electric machine.

However, the vanes 13 could be metallic, solid or hollow.

The vanes 13 are, as will be seen in the remainder of this description, attached to a hub 70 of the fan.

As illustrated in FIG. 4, the removable annulus 62 captures radially outer ends 64 of the vanes 13 of the fan 12 axially along the axis A, and also captures them transversely with respect to that axis A, that is, in a transverse plane T perpendicular to the axis A.

Figure 7:
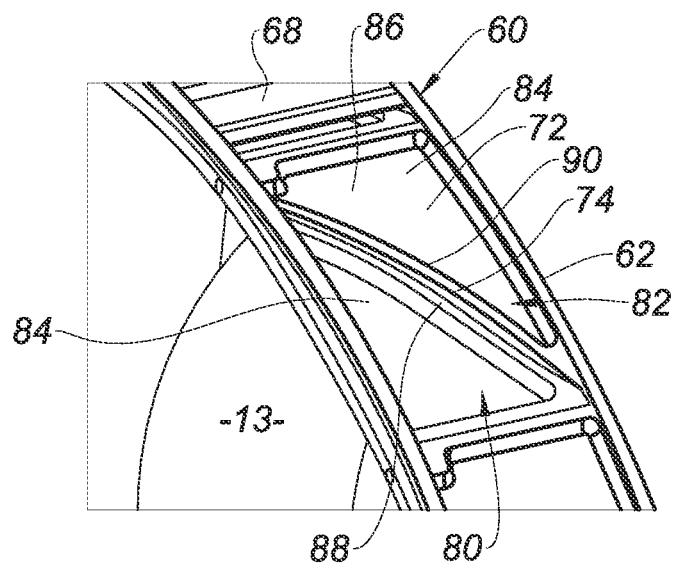
FIG. 7 is a detail view of the annulus of the electric machine of FIG. 4.

To this end, the annulus 62 comprises an annular wall 72 which extends at the level of the radially outer ends 64 of the vanes 13 and which comprises slots 74 passed through by these radially outer ends 64, each slot 74 having a shape complementary to that of the profile of the end 64 of a vane 13. FIG. 7 shows the detail of a slot 74.

As a result, the radially outer ends 64 of the vanes 13 have a radial degree of freedom and are susceptible to radial displacement in the slots 74 under the effect of the elongation of the vanes 13 when subjected to centrifugal forces and expansion of the annulus 62.

The slots 74 allow transverse forces to be taken up at the radially outer ends 64 of the vanes 13. In addition, the multitude of take-up forces distributed over all the vanes 13 ensures that the annulus 62 is centred.

Preferably, each radially outer end 64 of a vane constitutes an extension which follows the chord at the tip of the blade of said vane 13. The radially outer end 64 is therefore not an aerodynamically active surface of the vane 13 but is solely devoted to its attachment in the slot 74. Preferably, however, the radially outer end 64 is arranged in the extension of an aerodynamically active surface of the vane 13.

As will be seen in the remainder of this description, roots 76 of the vanes 13 are pinned into the hub 70, so that the assembly and the disassembly of the vanes 13 can be carried out axially. It is therefore important that the radially outer ends 64 are also extracted axially from the annulus 62.

Figure 8:
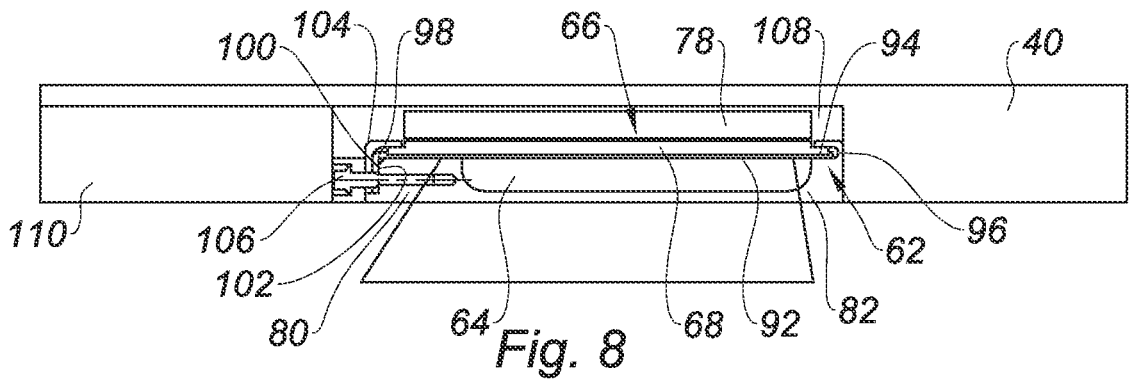
FIG. 8 is a cross-sectional detail view of the assembly of the vanes of the fan in the annulus of the electric machine.
Figure 11:
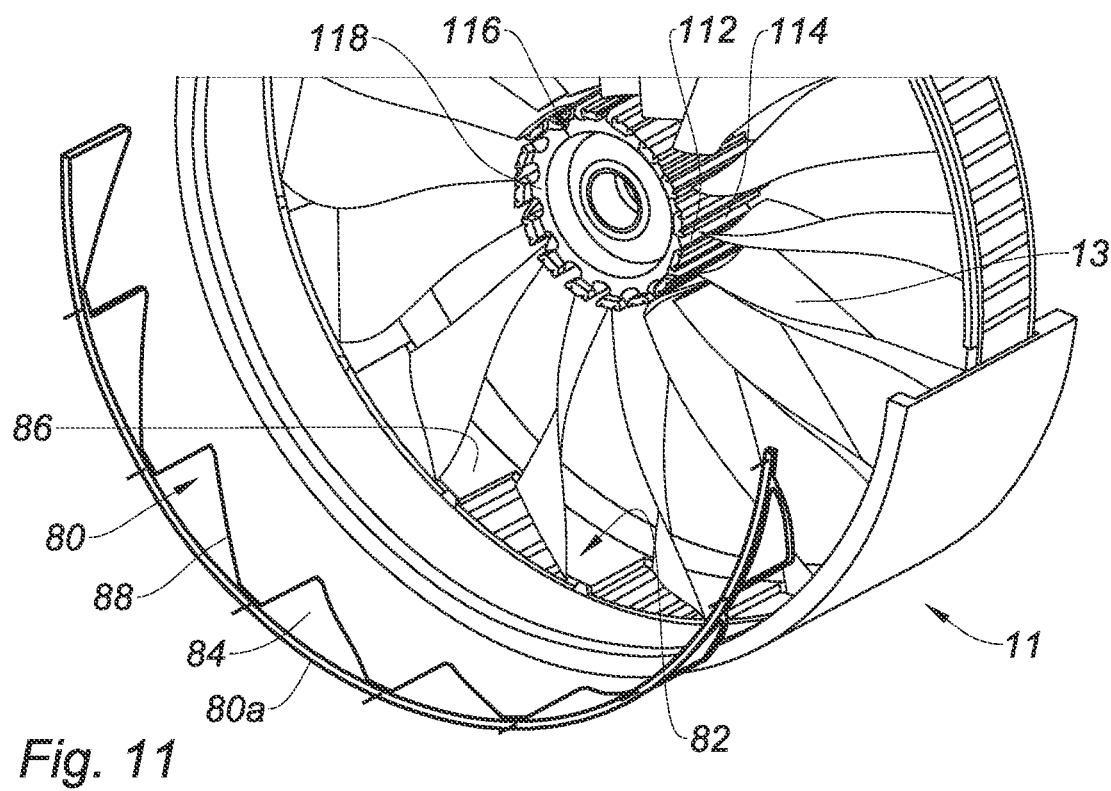
Figure 12:
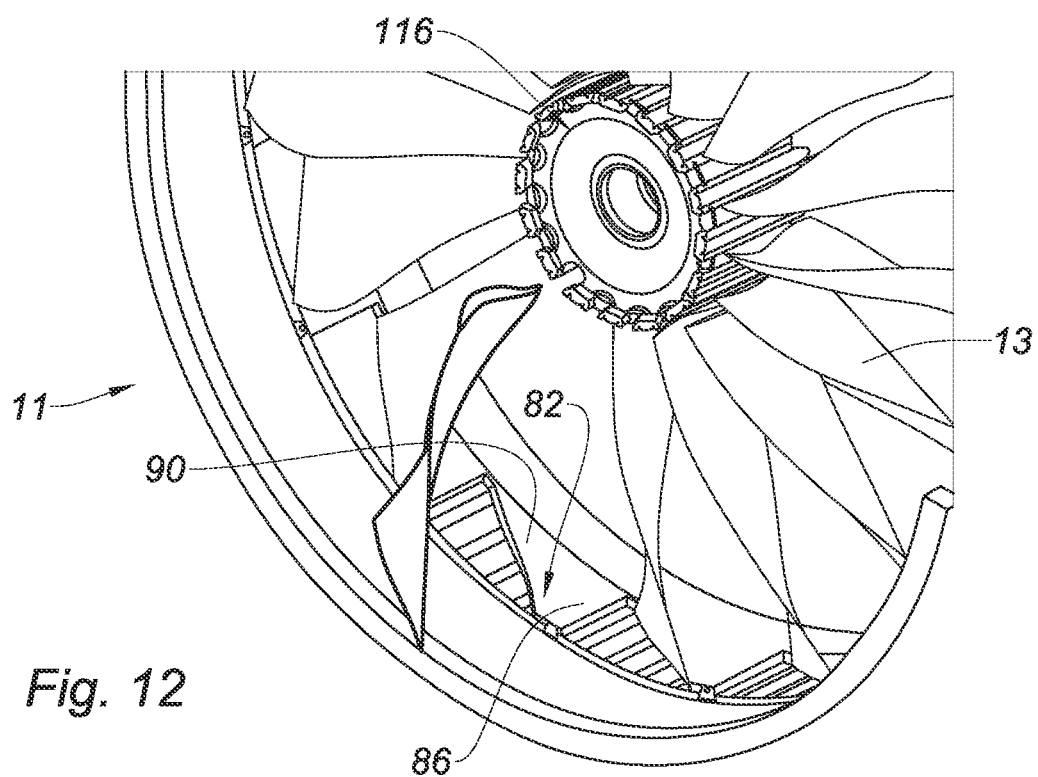
Figure 13:
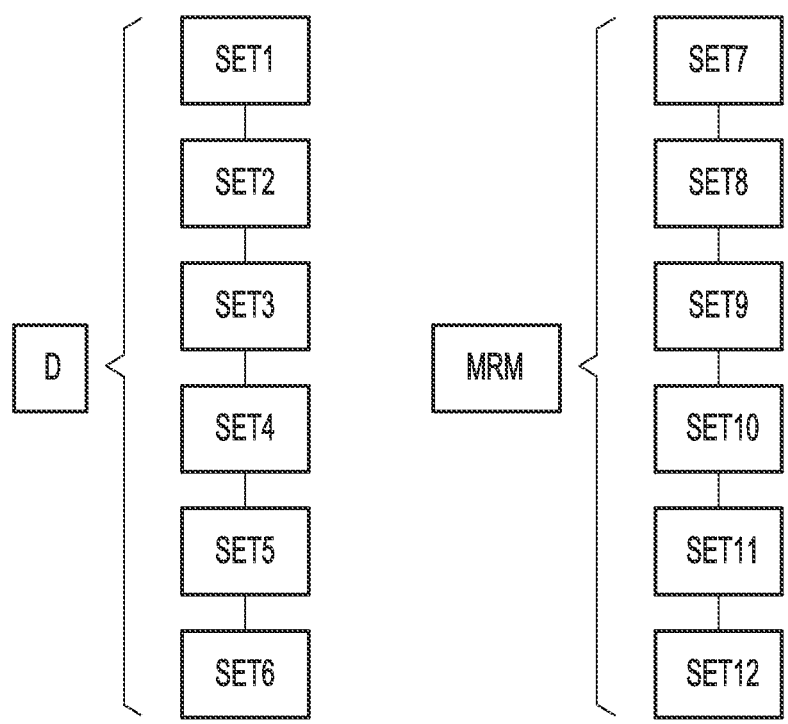
FIG. 13 is a block diagram illustrating the steps of a method for disassembling and assembling/reassembling a fan and an electric machine of a turbomachine according to the invention.

To this end, as illustrated in FIGS. 7, 8 and 11, the annular wall 72 of the annulus 62 is formed by an assembly of two annular rings 80, 82, respectively an upstream ring 80 and a downstream ring 82 embedded within each other. The rings 80, 82 are provided with corresponding teeth 84, 86 which extend substantially axially and which are substantially complementary to each other so as to define the slots 74 therebetween. Edges 88, 90 opposite the roots 84, 86 are thus respectively complementary to extrados 92 and intrados 94 sides of the radially outer ends 64 of the blades 13.

The rings 80, 82 thus capture the radially outer ends 64 of the vanes between their edges 88, 90 by taking them in a vice. A slight radial deflection of the vanes 13 is, as has been seen, permitted in the slots 74, so that the mounting of the vanes 13, otherwise immobilised in the hub 70, is not statically indeterminate and does not risk inducing radial stresses in the vanes 13.

With each vane 13 being taken in a vice between the rings 80, 82, the clearance at the tip of the vanes 13 is reduced, thereby improving the performance of the fan 12.

As further illustrated in FIG. 8, in the non-limiting embodiment shown here, the annulus 62 comprises an annular flange 92 which carries permanent magnets 68. This flange 92 caps the two rings 80, 82. The flange 92 comprises, on the one hand, a first end 94 which is received in an annular groove 96 formed in an outer radial collar of the downstream ring 82. On the opposite side, the flange 92 comprises a second end 98 provided with an inner radial collar 100 which is immobilised against a free face 102 of the upstream ring 80.

To enable the flange 92 to be fixed and the rings 80, 82 to be immobilised, the radial inner collar 100 of the flange is immobilised by means of an outer annular lock 104 which is pressed against the inner collar 100, and which receives axial screws 106 which pass through it. The screws 106 pass through the outer annular lock 104, the radial collar 100 of the flange, the upstream ring 80 and are received in the downstream ring 82 to clamp the rings 80, 82 one against the other.

The rings 80, 82 could be in one piece. However, as these are large parts, each upstream ring 80 or downstream ring 82 is formed from an assembly of two upstream or downstream half-rings extending at an angle of approximately 180 degrees. FIG. 11 shows an upstream half-ring 80a.

This design enables to extract only one of the two half-rings 80, for example, when only a limited number of vanes 13 facing this half-ring 80a need to be removed.

With regard to the mounting of the stator 66, the casing 40 advantageously comprises in its thickness an annular housing 108 which receives the stator 66 of annular shape and the annulus 62, and which receives on the side of the annular lock 104, a sectorised acoustic annular panel 110.

Figure 9:
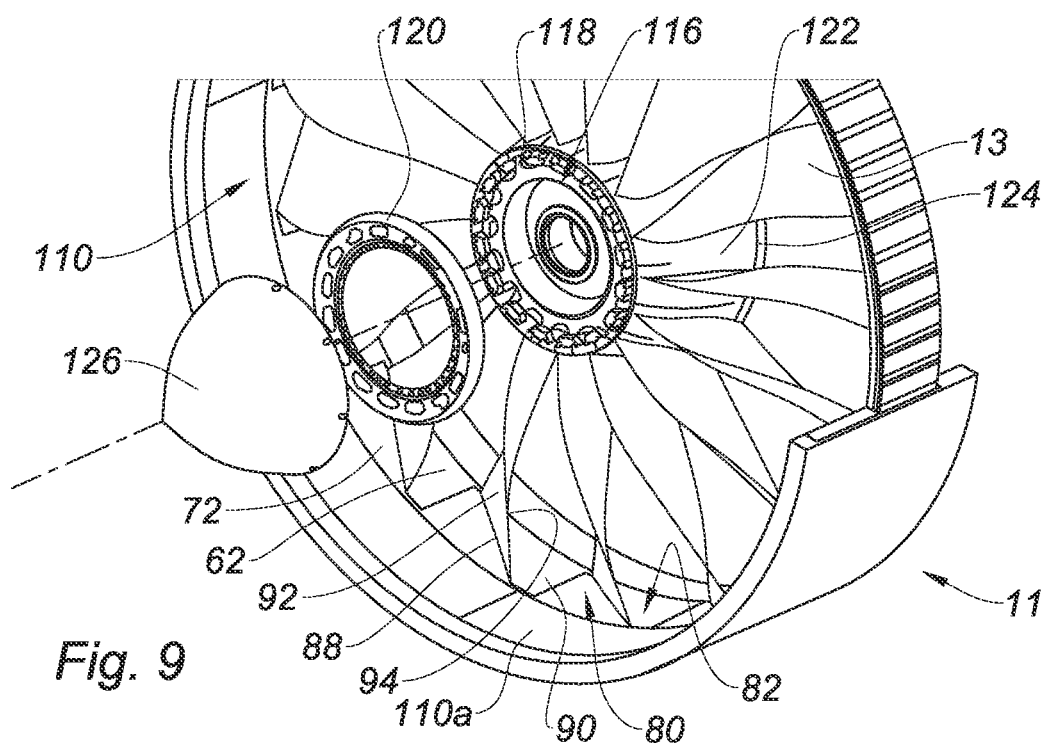
FIGS. 9 to 12 illustrate the steps for disassembly of an electric machine integrated into a fan according to the invention.

As illustrated in FIG. 9, the sectorised acoustic annular panel 110 comprises a plurality of sectors 110a, so as to enable it to be disassembled sector by sector. In particular, this design allows only a limited number of sectors 110 of acoustic panel 110 to be extracted, for example when only a limited number of vanes 13 are to be removed.

Indeed, it is an advantage of the invention that a limited number of vanes 13 can be extracted without removing the fan 12, which can remain in place under the wing of the aircraft.

Optionally, bearings (not shown) may be interposed between the rings 80, 82 or the flange 92 and the stator 66 to ensure the transfer of axial forces exerted on the fan 12. These bearings may be hydrodynamic, magnetic or aerodynamic.

In any event, it is important to ensure that the rotor 60 is perfectly balanced to avoid generating strong vibrations, as the greater the distance between the mass of a rotating element and its axis of rotation, the greater the imbalance.

As mentioned above, the vanes 13 are pinned to a hub 70 of the fan. As illustrated in FIG. 11, pin-shaped roots 112 of the vanes 13 are threaded axially into complementary pinning zones 114 which are formed at the periphery of a disc 116 of the hub 70. The pinning zones 114 open into an upstream face 118 of the shroud 116.

As illustrated in FIG. 9, the roots are axially locked into the pinning zones 114 by an inner annular lock 120. This inner annular lock 120 is secured by screws (not shown) received in an upstream end of the disc 116. It allow thus to axially lock the roots 112. The roots 112 may, for example, be dovetailed and received in complementary pinning zones 114 in the form of complementary slides. A fan cone 126 is further attached to the inner annular lock 120.

Figure 10:
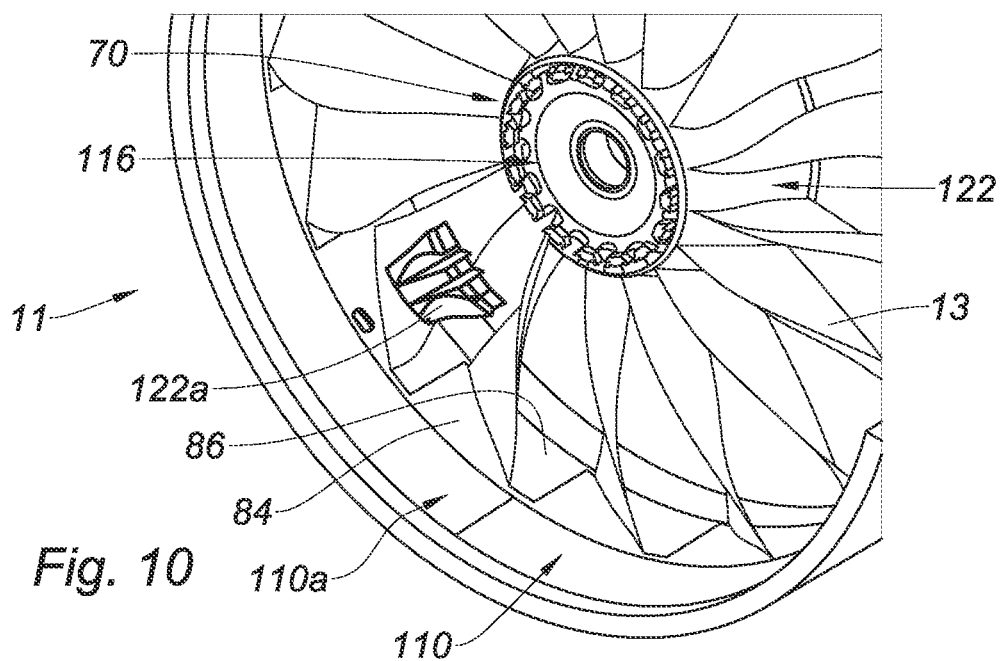

The hub 70 further comprises a sectorised annular covering wall 122 which surrounds the disc 116 of the hub 110. As illustrated in FIG. 10, sectors 122a of the sectorised annular covering wall 122 are arranged and extend between the blades of the vanes 13. As illustrated in FIG. 9, the sectorised annular covering wall 122 is held axially between a rear collar 124 of the disc 116 of the hub 70 and the inner annular lock 120.

In this configuration, at least one vane 13 of the fan 12 and the electric machine can be disassembled or reassembled respectively in accordance with a disassembly and assembly/reassembly method.

This method comprises in particular a disassembly step D comprising at least a first sub-step SET1 during which the fan cone 126, the inner annular lock 120, and at least one part of the sectorised annular covering wall 122 are disassembled by removing the sectors 122a of the shroud 116 of the fan hub 70 which surround at least the vane or the vanes 13 to be disassembled.

Then during a second sub-step SET2, the sectorised acoustic panel 110 is disassembled. To this end, the sectors 110a of this panel facing the vane 13 or the vanes to be disassembled are disassembled.

Then, during a third sub-step SET3, the outer annular lock 104 is disassembled. Then, during a fourth sub-step SET4, the annular flange 92 is extracted axially. Then, during a fifth sub-step SET5, at least one of the two half-rings of the upstream ring 80 facing the vane or the vanes 13 to be disassembled can be extracted axially. Finally, during a sixth sub-step SET6, the roots 112 of the vanes 13 are extracted axially from the rooting zones 114 of the shroud 116 of the hub 70, and the vane or the vanes 13 concerned by the disassembly are extracted.

Conversely, the method comprises in particular an assembly/reassembly step MRM comprising sub-steps SET7 to SET12 analogous to sub-steps SET1 to SET6 of the disassembly step D, taken in reverse order, whether it is a question of assembling a single vane 13, a given number of vanes, or all of them.

For example, in order to assemble or reassemble all the vanes 13 of a fan 12, in a seventh sub-step SET7, the roots 112 of the vanes 13 are axially inserted into the rooting zones 114 of the shroud 116 of the hub 70. Then, during an eighth sub-step SET8, the two half-rings of the upstream ring 80 are inserted axially. The two rings 80, 82 are then capped with the annular flange 92 during a ninth sub-step SET9. It is then immobilised with the annular lock 104 during a tenth sub-step SET10. The sectorised acoustic panel 110 is then mounted by successively inserting the sectors 110a of the panel into the annular housing 108 during an eleventh sub-step SET11. Finally, during a twelfth sub-step SET13, the sectorised annular covering wall 122 is mounted by inserting the sectors 122a of the shroud 116 around the fan hub 70, then the inner annular lock 120 is mounted, and finally the fan cone 126 is attached to the inner annular lock 120.

The invention thus provides a simple and reliable design of an electric fan module 11 comprising an electric machine integrated into a turbomachine fan 12.

Compared to a conventional design, it allows the mass of the permanent magnets to be transferred to the periphery of the annulus 62 and not to the outer end 64 of the vanes 13. This prevents a breakage of a vane due to, for example, ingestion of a foreign body from affecting the operation of the rotor 60. In addition, the holding of the ends 76 of the vanes in the annulus 62 minimises the masses that could be centrifuged in the event of a vane 13 breaking. In particular, with this design, a vane breaking near the hub does not, unlike conventional designs, result in the ejection of high energy centrifuged debris. This configuration allows a significant mass saving of the fan casing.

The invention claimed is:

1. An electric fan module of an aircraft fan, comprising:
   a fan provided with vanes which are rotatably movable inside a casing, each vane having a radially outer end, and
   an electric machine which can operate as a motor or as a generator, the electric machine comprising a rotor secured to the fan and a stator integrated into said casing,
   wherein the rotor of the electric machine is integrated into the fan and comprises a removable annulus which captures only axially and transversely the radially outer ends of the vanes of the fan, which leaves the radially outer ends of the vanes radially free with respect to the removable annulus, wherein the removable annulus is received inside said stator, which is integrated into the casing, and
   wherein the removable annulus comprises an annular wall which extends at a level of the radially outer ends of the vanes and which comprises slots passed through by the radially outer ends of the vanes, each slot having a shape complementary to a profile of the radially outer end of the respective vane passing through said slot.

2. A turbomachine comprising an electric fan module according to claim 1, further comprising a planetary or epicyclic reduction gearbox, members of which planetary or epicyclic reduction gearbox are connected to the casing of the turbomachine, to a shaft of a low-pressure body, and to a drive shaft of a hub of the fan.

3. The electric fan module according to claim 1, wherein the radially outer end of each vane constitutes an extension which follows a chord at a tip of a blade of said vane.

4. The electric fan module according to claim 3, wherein the annular wall of the removable annulus is an assembly comprising two annular rings, respectively upstream and downstream, said two annular rings each being provided with teeth which extend axially, wherein the teeth of the two annular rings are complementary to each other so as to define between them said slots.

5. The electric fan module according to claim 4, the removable annulus comprises an annular flange carrying magnetic elements of the electric machine, wherein the annular flange caps the two rings and comprises a first end received in an annular groove formed in an outer radial collar of a first of the annular rings and a second end provided with an inner radial collar immobilized against a free face of a second of the annular rings.

6. The electric fan module according to claim 5, wherein the inner radial collar of the annular flange is immobilized by an outer annular lock which is pressed against said inner collar, and which receives axial screws which pass through said outer annular lock, the inner radial collar of the annular flange, the second annular ring, and which are received in the first annular ring in a configuration that clamps the two annular rings against each other.

7. The electric fan module according to claim 6, wherein the casing comprises an annular housing which receives the stator and the removable annulus, and which receives, on a side of the annular lock, a sectorized annular acoustic panel.

8. The electric fan module according to claim 6, at least one of the annular rings is formed from an assembly of two half-rings extending angularly over 180 degrees.

9. The electric fan module according to 7, wherein the fan comprises a hub which carries the vanes, wherein roots of the vanes are shaped like pins and threaded axially into complementary pinning zones formed on a periphery of an internal disc of the hub and which open into an upstream face of a shroud, said roots being locked axially in the pinning zones by an inner annular lock which is secured by screws received in an upstream end of the shroud.

10. The electric fan module according to claim 9, wherein the hub comprises a sectorized annular covering wall which surrounds the internal disc of the hub extending between the vanes, and which is held axially between a rear collar of the internal disc of the hub and the inner annular lock, and wherein the hub comprises a fan cone which is secured to said inner annular lock.

11. A method of disassembling and assembling/reassembling at least one vane of the electric fan module according to claim 10, wherein the method comprises:
   a disassembly step (D) comprising:
      a first sub-step (SET1) during which the fan cone, the inner annular lock, and the sectorized annular covering wall of the fan hub are disassembled to free at least one root of said at least one vane, a second sub-step (SET2) during which at least one part of the sectorized acoustic panel facing said at least one vane is disassembled, a third sub-step (SET3) during which the outer annular lock is disassembled, a fourth sub-step (SET4) during which the annular flange is axially extracted, a fifth sub-step (SET5) during which at least one upstream half-ring facing said at least one vane is axially extracted, a sixth sub-step (SET6) during which the root of said at least one vane is axially extracted from the hub, and an assembly/reassembly step (MRM) comprising the sub-steps of the disassembly step, executed in reverse order.

* * * * *